Dec. 30, 1969   A. E. ROBERTSON ET AL   3,486,332
POWER PLANT
Filed Oct. 12, 1961   4 Sheets-Sheet 1
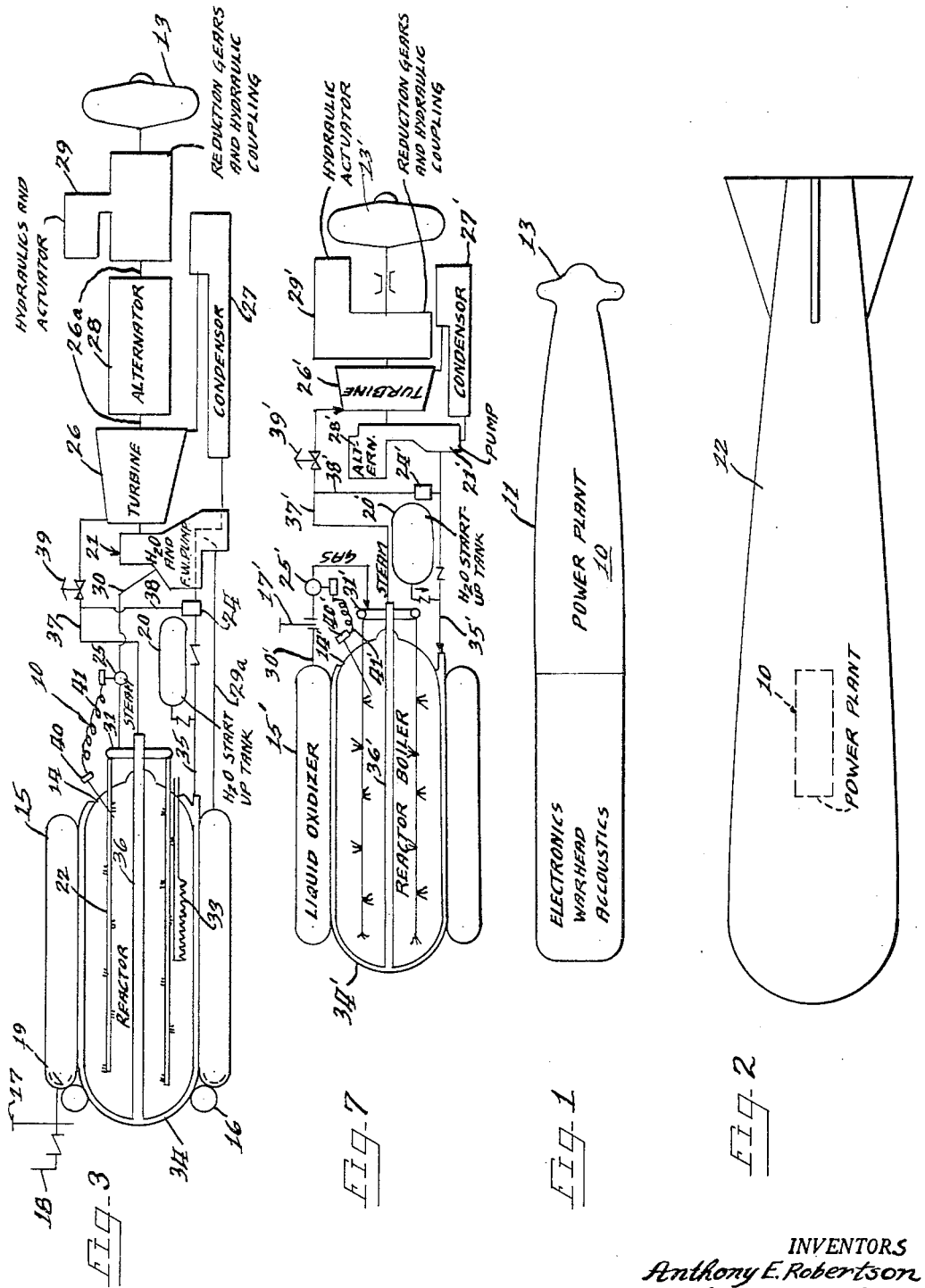
INVENTORS
Anthony E. Robertson
Richard S. Pauliukonis
Hans P. Eichenberger
BY
ATTORNEYS

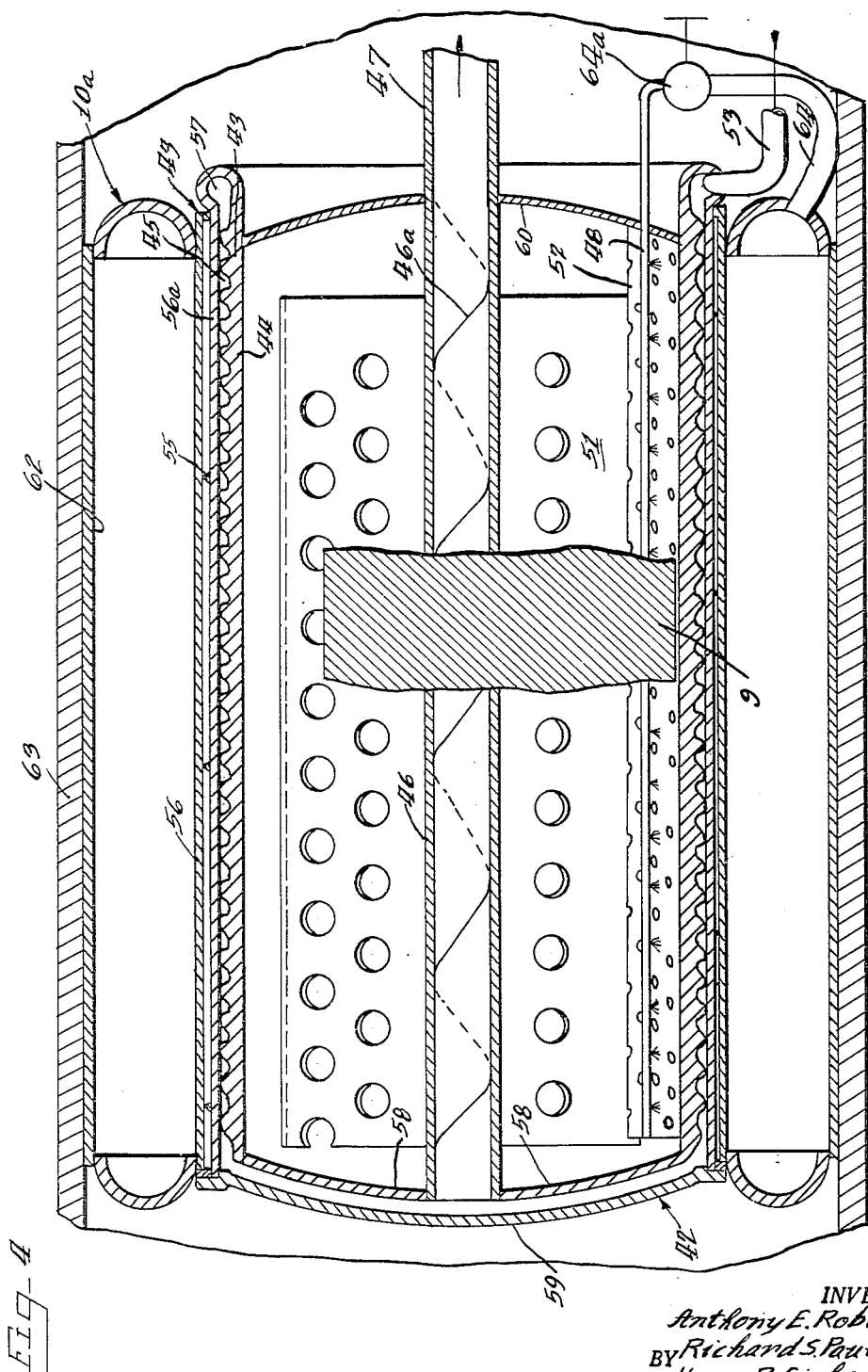

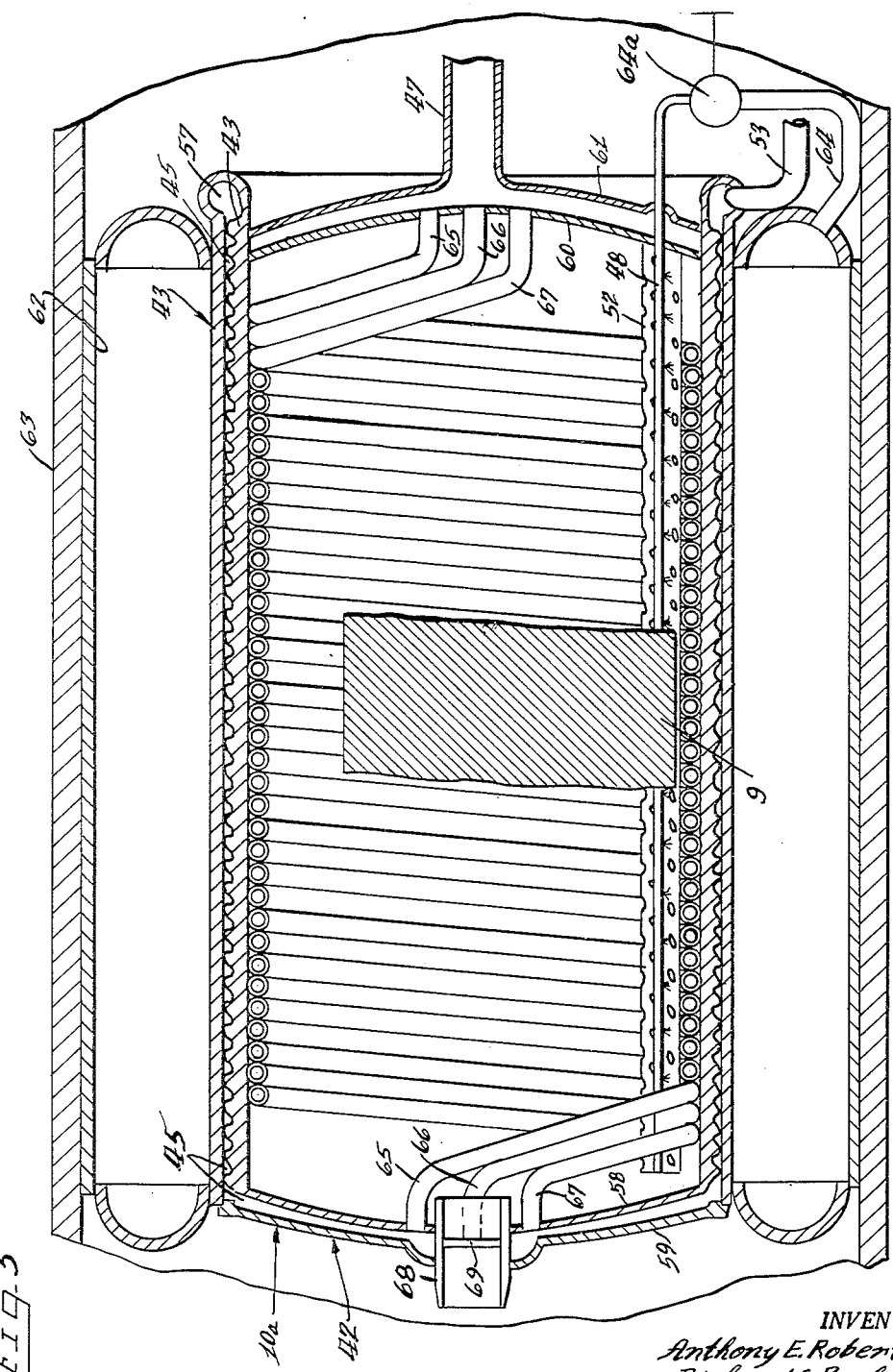

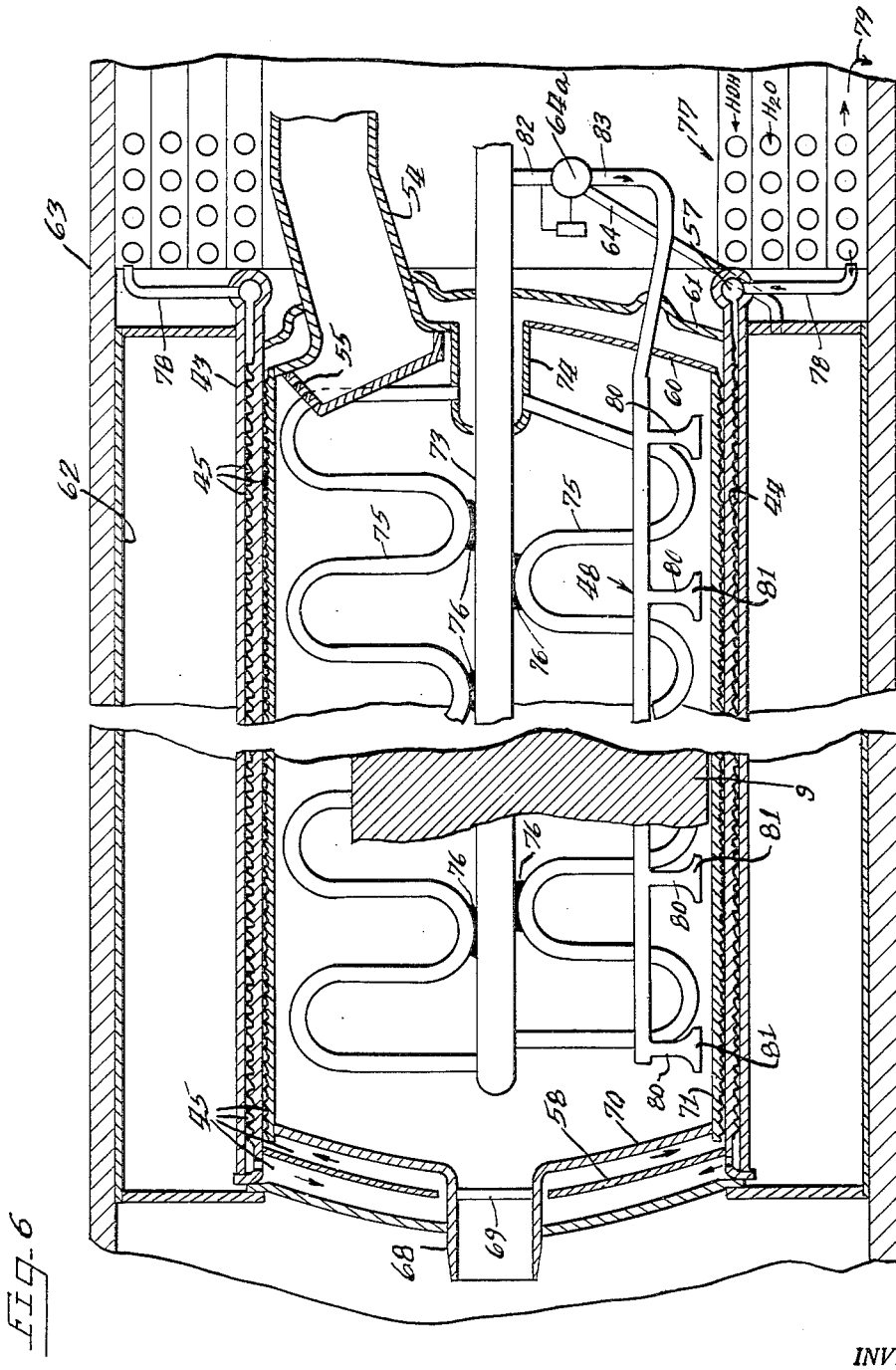

United States Patent Office 3,486,332
Patented Dec. 30, 1969

3,486,332
POWER PLANT
Anthony E. Robertson, Willoughby, and Richard S. Pauliukonis and Hans P. Eichenberger, Cleveland, Ohio, assignors to TRW Inc., a corporation of Ohio
Filed Oct. 12, 1961, Ser. No. 144,652
Int. Cl. F01k 25/00, 27/00; F22b 37/10
U.S. Cl. 60—50                                    13 Claims

ABSTRACT OF THE DISCLOSURE

This invention relates to power systems, and more particularly to a power system utilizing a lithium type fuel which is defined as comprising lithium, lithium hydride and alloys containing at least 50% lithium, the other constituents being one or more of the following metals: Al; Mg; Be; Ca; Na and K, and an oxidant to produce heat taken up by a working fluid to be expanded in a heat engine.

---

The invention thus has application in underwater power systems, using water as the working fluid for example; in space power systems preferably using mercury as the working fluid; as well as in other systems requiring self-contained operation with extensive range and minimal noise, although the invention is not limited to such uses.

In particular, the power system of the invention is adapted to meet the high performance requirements of torpedoes to be used with submarine vessels of high-speed and depth capabilities. Torpedoes previously in use, for example, have been powered by open cycle heat engines which exhausted to ambient pressure. Such engines are depth sensitive in that the performance falls off rapidly with increasing back pressure, Also, the open cycle heat engines are generally noisy and leave a visible wake. Battery powered, electrically driven torpedoes are not subject to these objections, and the more recent torpedoes have generally been of this type. However, battery powered torpedoes do not have the speed and range capability necessary.

The power system of the present invention fulfills the requirements of high performance torpedoes more effectively than other currently available or proposed power systems and to this end utilizes a fuel which may be lithium, and an oxidant such as bromine pentaflouride, although not being limited thereto. In a suitable embodiment, lithium type fuel is housed in a reactor surrounded axially by an oxidant tank, and the oxidant is sprayed into the reactor container to react with the lithium type fuel, with an attendant evolution of a large amount of heat.

The heat evolved in the lithium type fuel reactor is removed by heat exchanger means which preferably comprise tubes passing through the reactor, through which a working fluid is passed. In underwater applications, water is a suitable working fluid with the water being converted into steam which in turn is expanded in a heat engine to produce useful work. Thereupon, the exhaust is condensed and pumped back to the lithium type fuel reactor in a closed cycle. For space power systems, the working fluid preferably is mercury.

Although the power system of the invention affords power conversion by means of a turbine, in a suitable application thereof, a positive displacement engine is also encompassed within the scope of the invention, and numerous variations of the system are similarly encompassed therein. Thus to obtain quick starts, the lithium type fuel can be brought to a desirably high temperature by electric heating means and the like, where the system is used in torpedoes and prior to firing the torpedoes. As mentioned, the working fluid for space applications may be mercury rather than water, in order to alleviate the problem of heat rejection. However, working fluids other than mercury and water can be utilized in accordance with particular conditions.

It is, therefore, an object of the present invention to provide a power system having a high energy capacity on a weight and volume basis, as compared with conventional systems.

Another object of the invention is to provide a power system as described which is simple and easy to control, as compared to heat engine power plants generally available, since only two controls are basically needed, including a control to regulate the rate of oxidant injection in order to keep the temperature of the lithium type fuel reactor at a preselected value, and a control to regulate the rate of pumping water in the closed cycle in order to obtain the desired power. Inasmuch as these controls do not require a high degree of metering, the control problem is minimal.

Another object of the invention is to provide a power system which, as embodied in torpedoes and underwater vessels, is essentially wakeless, since the system does not reject any physical materials to the ambient water, and only heat is released thereto.

Another object of the invention is to provide a system which as a result of the absence of exhaust minimizes the production of noise. Thus the possible noise sources are limited to oxidant and fresh water pumps and the heat engine. The system therefore tends to be optimal in this respect.

Another object of the invention is to provide a power system which, in an embodiment utilizing compressed oxygen or the like to feed the oxidant to the reactor, prevents shifts in the center of gravity of devices such as torpedoes or the like.

Another object of the invention is to provide a power system as described which has exceptionally high performance characteristics when installed in a torpedo.

Another object of the invention is to provide a reactor in which solid or liquid lithium type fuel is stored and oxidized in place by the addition of an oxidant thereto.

Another object of the invention is to provide a system as described in which at least parts of the products of the reaction are liquid at all times, to assure adequate heat transfer from the reacting materials to the working fluid passed therethrough.

Other objects and advantages of the invention will become apparent as the description proceeds in accordance with the drawings in which:

FIGURE 1 is a diagrammatic view of a torpedo embodying the power plant of the present invention;

FIGURE 2 is a diagrammatic view of a power plant as embodied in a space vehicle;

FIGURE 3 is a schematic view of one embodiment of the power plant of the invention;

FIGURE 4 is a vertical sectional view, partly broken away, of another embodiment of the power plant according to the invention;

FIGURE 5 is a vertical sectional view, partly broken away, of another embodiment of a power plant according to the invention and similar to that of FIGURE 4;

FIGURE 6 is a vertical sectional view of another embodiment of a power plant according to the present invention, partly broken away, and similar to the embodiments of FIGURES 4 and 5; and FIGURE 7 is a schematic view of another power plant according to the invention.

Referring now to the drawings, and to FIGURES 1-3 in particular, a power system 10 is shown which may be utilized in a torpedo 11 as shown in FIGURE 1, or in a space vehicle 12 as shown in FIGURE 2 wherein work output of the power system is taken up in control or energizing of the vehicle as understood by those skilled in the art.

The power plant 10 is shown in FIGURE 3 as driving a propeller 13 such as may be utilized in the torpedo 11 and includes a reactor 14 surrounded axially by an oxidant tank 15, an additional oxygen (or some other suitable gas) tank 16 for pressurizing the oxidant when necessary in response to a starting trigger 17, a sea water inlet 18 for alternatively pressurizing the bladder 19, a fresh water start-up tank 20 and pump means 21 for circulating fresh water through the reactor and for pumping the oxidant through spray means 22. The system 10 also includes a regulator 24 for regulating the rate of pumping water in a closed cycle to obtain desired power, and a regulator 25 to regulate the rate of injection of oxidant into the reactor 14 so as to keep the temperature of the reactor at a preselected value. In a suitable example, the oxidant may be bromine pentaflouride.

In the embodiment shown, a turbine 26 is driven by working fluid steam after it has been heated in the reactor, and the exhausted steam is passed through a condenser 27 with the water resulting from condensation of the steam being recirculated to the pump 21. The turbine 26 may be a constant speed variable load turbine with a drive shaft 26a driving a constant speed alternator 28 for producing auxiliary power, and the drive shaft also actuates means for driving the propeller 13 as indicated at 29 and which may include hydraulic means and actuators, reduction gears and two-speed hydraulic coupling for applications requiring speed change, in the example shown.

In operation, actuation of the trigger valve 17, which may be of any suitable type, pressurizes oxidant by introducing compressed oxygen or other gas from the tank 16 disposed annularly around the reactor 14 adjacent the end of the tank 15, to release the compressed gas into pressure relation with the bladder 19. Alternatively, the starting process may open a sea water valve for the inlet 18 to pressurize the bladder 19. Or an oxidant may be used which is gaseous or otherwise self-pressurizing for effecting the transfer therefrom the tank 15. Thereupon, the oxidant may be caused to flow into the spray means 22 as pumped by the pump means 21. The oxidant thus passes in a circuit through a conduit 29a leading to the pump means 21 and a conduit 30 leading from the pump means 21 through the control valve 25 to an annular manifold 31 communicating with spray pipes 22 extending through the reactor wall. When the oxidant is introduced into the reactor through the spray pipes 22 or the like, the lithium type fuel is reacted to release heat.

The material in the reactor will thus be pure lithium type fuel initially. If pure lithium is used as the fuel and hydrogen peroxide is used as the oxidant, when approximately one third of the hydrogen peroxide has been added, the material will consist largely of a 50/50 molar mixture of lithium oxide and lithium hydride. At the end of the reaction, the product will be essentially pure lithium hydroxide, although if some hydrogen is evolved, it can be led off as hereinafter discussed. While the lithium oxide has a melting point that is above 3000° F., the lithium hydride has a melting point of 1256° F. and therefore can be kept in a liquid state to maintain a reasonably good heat transfer environment throughout.

It will be understood that the salt water inlet may provide salt water displacement of the oxidant to avoid pumping of this material. Also, the lithium type fuel can be preheated by electrical means indicated diagrammatically at 33 where the plant 10 is used in a torpedo 11 prior to firing the torpedo, to provide quick starting action.

The water in the reactor 14 may be disposed in a water circulating means 34 formed therearound and may be supplied from the water start-up tank 20 through a conduit 35. When the reaction in the reactor causes steam in the water thus supplied to reach a predetermined pressure, or when minute steaming starts, flow through the closed water cycle is initiated, a central conduit 36 communicating with the circulating means 34 and with a conduit 37 to drive the turbine 26, which is preferably a variable load constant speed device. The exhausted steam is passed to the condenser 27 and the water resulting from condensation of steam in the condenser is passed back to the pump means 21, which is driven by the turbine 26. The control 24 regulates the rate of pumping water in the closed water cycle to obtain the desired power, and may be coordinated with the steam output by a conduit 38 communicating with the conduit 37. Further control is effected by a governor valve 39 which may or may not be interlocked with the oxidant valve 25 by suitable means (not shown), the governor valve 39 thus affording a feed back function to maintain the desired power. In the operation of the control 25, a thermocouple means 40 may be provided which is sensitive to the temperature in the reactor and controls the control 25 through a signal line 41.

Thus the system is simple in concept as compared with previously available heat engine power plants, and essentially only two controls are needed, for controlling the rate of oxidant injection to keep the temperature of the lithium type fuel reactor at the preselected value and for controlling the rate of pumping water in the closed cycle to obtain the desired power. Since neither of these controls requires a high degree of metering, the control problem is minimal.

In previously available torpedoes, consumption of propellant has generally produced a shift in the center of gravity of the torpedo, which has created a problem from the standpoint of torpedo control. Also, weight changes in the torpedo resulting from propellant consumption may be undesirable. In the embodiment of FIGURE 3, these problems can be resolved by pressurizing the oxidant with compressed gas from the storage tank 16. Thereby, weight is maintained constant and no appreciable shift in the center of gravity will occur as the propellant is consumed.

The torpedo 11 utilizing the power plant 10 of the invention may be of the air-drop or ship launched type, and on a specified volume and weight limitation basis for the air-drop type and a volume basis for the ship launched type, design criteria are met to an optimal extent.

As noted previously, the reaction may provide for a liquid environment throughout for good heat exchange and in this connection, it may be noted that the heat liberated in the reactor will quickly melt the lithium type fuel which will unusually have a melting point at or below that of lithium, which is 367° F. And intermediate and ultimate reaction products may in general be kept in a liquid state, or a liquid environment, so that heat exchange with the working fluid will be effective throughout the cycle.

In the system 10 as utilized in the space vehicle 12, the working fluid may be mercury rather than water, since the problem of heat rejection or dissipation encountered in such applications is thereby alleviated. It will, however, be understood that in the various applications with which the power system of the invention may be utilized, and in those described, other working fluids can be used in accordance with particular conditions and requirements.

Referring now to FIGURE 7, another power plant is shown which is similar to the power plant 10 and likewise operates in a closed Rankine cycle and with a pressurized liquid oxidizer which is here disclosed as being sulfur hexaflouride for purposes of exemplifying the system utilized therewith. Thus a lithium type fuel reactor boiler 14' is provided which is surrounded by an oxidizer tank 15' herein set forth as containing the novel oxidizer sulfur hexaflouride in liquid form. Upon actuation of a trigger valve 17′, pressurized oxidizer flow is started through the line 30′ operatively associated with the trigger valve and leading to the inlet manifold 31′, and water flow is started from the reservoir or start-up tank 20′ to the reactor via line 35′, substantially as hereinbefore described. Further control is afforded by the thermocouple 40′ and the oxidant reducing valve 25′, the thermocouple being interlocked with the valve 25′ by the line 41′ and also interlocked with the governor 39′, substantially as in the case of the preceding embodiment. Thus it will be appreciated that the need for particular pressurizing means is eliminated in the form herein set forth, and no special oxidant pump is required. The system is otherwise similar, and the water passes through the water circulating jacket or means 34′ so that when the reaction in the reactor creates heat, the steam resulting is passed through the central conduit 36′ to a conduit 37′ as controlled by the governor 39′, to drive the turbine 26′, which may be a variable r.p.m., constant load turbine. The turbine 26′ drives a constant speed alternator 28′ and pump means 21′, and also drives means for actuating the propeller 13′, indicated at 29′ and which may include reduction gears, two speed hydraulic coupling means when speed changes are required and hydraulic actuators. The exhausted steam is passed to the condenser 27′ and is condensed so that the pump means 21′ will pump the resulting water through the reactor for reheating and creation of steam as described. The control 24′ regulates the rate of pumping water in the closed cycle to obtain the desired power, and may be coordinated with the steam output by a conduit 38′ communicating with the conduit 37′.

Referring now to FIGURE 4, another embodiment of the invention is shown as designated by reference numeral 10a, and which can be used for reacting lithium type fuel with oxidants, such as bromine pentafluoride or hydrogen peroxide. The several embodiments of the invention may also be used with other oxidants in a similar manner as hereinafter discussed.

The system 10a is effective to convert a working fluid into the gas phase to be expanded in a heat engine so as to produce useful work, as previously described, and for example a turbine as disclosed in FIGURES 3 and 4 may be thus energized.

The power system 10a thus includes a reactor 42 with a fuel 9 therein and with an outer wall structure generally designated by reference number 43 and an inner wall 44 forming a conduit or jacket 45 for circulating working fluid around the reactor. The jacket 45 is in communication with a coaxial conduit 46 provided with an internal helix-insert 46a both extending through the reactor to transmit vaporized working fluid such as steam to an integral conduit 47 where it may be expanded in a heat engine as described. Thus spray means 48 extend into the reactor 42 for introducing oxidant thereinto. A plurality of perforated fins 51 may be secured coaxially along the conduit 46 in angularly spaced relation therearound and a baffle 52 may be secured to the wall 44 adjacent the spray means 48. A conduit 53 leads into the jacket 45 to pump water therethrough by means of a pump (not shown) as hereinbefore described. The spray means 48 may have spray orifices formed axially therealong, and the fins 51 effectively distribute the oxidant to be reacted with the fuel and afforded an improved heat transfer to the conduit 46. The outer wall structure 43 is preferably of a double wall construction with spacer means 55 therein between an outer portion 56 and an inner portion 56a to provide an air gap or other type insulation, the inner portion 56a thereof being reversely turned and integral with the previously referred to inner wall 44 to provide an annular conduit 57 for distributing the water from the conduit 53. The conduit or jacket 45 has a helical path as defined by the wall 44 in cooperation with the wall 43 to circulate the water around the reactor for full heat exchange therewith. An end wall portion 58 of the wall 44 is spaced from a back wall 59 for the reactor to form a portion of the passage or conduit 45 leading to the conduit 46, the conduit 46 being supported in the end wall portion 58 and also in an opposite end wall 60, with the preferably integral conduit portion 47 extending therefrom as shown.

In a preferred form of the invention, the system 10a has an oxidant container 62 axially surrounding the reactor 42 and retained within the hull as diagrammatically indicated at 63. A conduit 64 leads from the container 62 and may communicate through pump and control means 64a with the spray means 48, to introduce oxidant such as bromine pentafluoride to the spray means under control such as may maintain the temperature of the reaction at a desired value.

Referring now to FIGURE 5, another embodiment of the invention is shown which substantially corresponds with the embodiment of FIGURE 4 and wherein similar parts are designated by similar reference numerals. However, in the construction, the conduit 46 and baffles 51 are dispensed with and instead the working fluid is circulated through the passage 45 and between the walls 58 and 59 from conduit 53, which leads to a fluid pump (not shown), and is introduced through a plurality of conduits 65, 66 and 67, etc., or any suitable number of such conduits, which are then wound around the inner surfaces of the wall 44 in mutually abutting interfitted relationship for a maximized heat exchange relationship with the heat produced in the reactor. The tubes 65, 66 and 67 communicate with the conduit 47 so that the working fluid may be expanded in a heat engine or the like. Where a liquid oxidant is used as described, the fluid from conduit 64 may be pumped by suitable pump and control means 64a into spray means 48. The conduits 65, 66 and 67, etc. may be led from the passage 45 in any suitable manner. A tubular central insert 68 is provided, closed by the wall 69, which affords a means of filling the reactor with fuel, and in the embodiment shown, the conduits 65, 66 and 67 etc., are formed around this insert.

Referring now to FIGURE 6, another embodiment of the invention is shown wherein similar parts are designated by similar reference numerals. The construction of FIGURE 6 is similar to that in FIGURE 5, but the fuel insert structure 68 is formed continuously with an inner wall 70 which cooperates with the wall 58 to form a reversely turned channel, the wall 58 terminating radially in spaced relation to the insert 68. A wall 71 extends between the wall 70 and the wall 60 is externally configured to cooperate with the wall 44 in providing a reverse helical flow path leading to the opening between the walls 60 and 61. The walls 60 and 61 receive therethrough a conduit 73, and the wall 60 is turned inwardly centrally to form a distribution wall 74 in proximately spaced relation around the conduit 73 at its inner end disposed in sealed relationship therewith. In order to afford an even greater heat exchange relation with the working fluid, a plurality of sinous tubes 75 communicate with the flow channel formed by the distribution wall 74 and extend into the reactor for a major portion of the length thereof, with the sinousity of the tubes 75 providing a radial dimension thereof approximating the radius of the reactor chamber. The tubes 75 may be secured to the conduit 73 by welding 76 so that they are disposed in angularly spaced relation around the said conduit 73. At their innermost ends the conduits 75 communicate with a closed end of the conduit 73 so that the vaporized fluid is directed outwardly through the conduit 73 to afford a means of driving a turbine or the like as hereinbefore described.

Further in accordance with the invention, an economizer 77 may be provided to receive exhausted steam and thereby preheat the water entering the conduits 78 and the annular inlet passage 57. Excess working fluid may be passed overboard from the economizer 77 as indicated at 79.

In this embodiment, there is illustrated means to supply water to the fuel to react therewith if such is desired. The water supply is tapped from the conduit 73 by conduit 82 and is interconnected to conduit 83 by control means 64a. The control means 64a controls both the amount of water and the oxidizer delivered to the conduit 83. The oxidant container 62 has a conduit means similar to the conduit means 64 illustrated in FIGURES 4 and 5 which is connected to the conduit 83 through the control means 64a or a conduit means 29a, as illustrated in FIGURE 1, which connects the oxidant tank to the pump 21 and the pump in turn is connected through conduit means 30 to the control means 64a. The conduit 83 communicates with the spray means 48 which may include axially spaced spray tubes 80 having relatively wide spray heads 81 for effective distribution without the use of the baffle structure of the preceding embodiment, and the device is effective to operate with a water input controllably recirculated from the output and utilized in conjunction with the oxidant supply, with an outlet tube or lead-off line 54 being provided for the hydrogen evolved in the reaction, and a screen 55 being disposed in front of this lead-off line. Where liquid oxidant is used, a pumping means will be utilized as previously described, in order to move the oxidant into the spray means 48.

There has thus been provided a power system which is adapted to fulfill the requirement of high performance torpedoes more effectively than other systems currently available or proposed, and which also has utility in space systems and other devices. The system of the invention is characterized by a high energy content on a weight and volume basis, and is simple and easy to control. Further, the system may be essentially wakeless when used in a torpedo, and has the advantage of exceptionally silent operation, since there is no exhaust. Control can be rendered extremely accurate since the problem of shifts in the center of gravity or variations in weight encountered previously can be eliminated by means of pumping or displacing the oxidant with a fluid such as compressed oxygen nitrogen, etc., so that undesirable changes do not occur as propellant is consumed. Thus the system affords advantages in a wide range of applications in addition to those described.

We claim as our invention:

1. A reactor boiler system comprising a reactor forming a reaction chamber, a container for oxidant encircling said reactor having walls, a supply of lithium type fuel in said reaction chamber, means for transmitting said oxidant from said container into said reaction chamber and means for circulating a working fluid through said reaction chamber including reactor wall means forming a helical path around said reaction chamber and conduit means communicating with said helical path and having a conduit portion extending through said reaction chamber generally parallel to its axis.

2. A power system comprising a reactor, a container for oxidant surrounding said reactor, a supply of lithium type fuel in said reactor, means for transmitting oxidant from said container into said reactor, means for circulating a working fluid through said reactor including reactor wall means forming a helical path around said reactor and conduit means communicating with said helical path and having a conduit portion extending coaxially through said reactor and fins mounted on said conduit for an effective distribution of oxidant and an improved heat transfer.

3. A reactor boiler system comprising a reactor, a container for oxidant encircling said reactor, a supply of lithium type fuel in said reactor, means for transmitting oxidant from said container into said reactor and means for circulating a working fluid through said reactor including reactor wall means forming a helical path around said reactor and conduit means communicating with said helical path and having a plurality of tubes wound helically within said reactor along the inner surface of the wall means and a conduit leading from said reactor and communicating with said tubes.

4. A power system comprising a reactor, a container for oxidant surrounding said reactor, a supply of lithium type fuel in said reactor, means for transmitting said oxidant from said container into said reactor and means for circulating a working fluid through said reactor including reactor wall means forming a double helical path around said reactor, a conduit extending through said reactor and having a closed end in said reactor and conduit means communicating with said double helical path and including a plurality of sinuous tubes mounted radially on said conduit within said reactor and leading into said closed end thereof.

5. A power system comprising a reactor, a container for oxidant surrounding said reactor, a supply of lithium type fuel in said reactor, means for transmitting said oxidant from said container into said reactor and means for circulating a working fluid through said reactor including reactor wall means forming a double helical path around said reactor, a conduit extending through said reactor and having a closed end in said reactor, means communicating with said double helical path and including a plurality of sinuous tubes mounted radially on said conduit within said reactor and leading into said closed end thereof and an economizer communicating with an inlet for said double helical path.

6. A power system comprising:
a reactor having walls forming a reaction chamber for the reaction of a fuel and an oxidant,
a helical groove formed in the outer periphery of the reaction chamber,
means forming with said helical groove a helical flow passageway around the periphery of said reaction chamber, with said reaction chamber walls,
a conduit axially passing through said reaction chamber, one end of said conduit being connected to said helical flow passageway to receive a working fluid therefrom and flow said working fluid within said conduit through the reaction chamber to the other end of said conduit,
means to supply a working fluid to said helical flow passageway,
means connected to the other end of the helical flow passageway to receive the working fluid from the conduit,
a spray means axially extending into said reactor for a major portion of the length of the reaction chamber and adapted to spray substantially along the length thereof,
means to supply oxidant to said spray means,
said spray means being adapted to spray the oxidant into the reaction chamber to be reacted with fuel,
an axially extending perforated deflector mounted in said reaction chamber adjacent said spray means, and
axially extending a plurality of spaced fins mounted in said reaction chamber.

7. A power system comprising:
a reactor having walls forming a reaction chamber for the reaction of a fuel and an oxidant,
means forming a double helical flow passageway around the outer periphery of said reaction chamber,
a conduit axially passing through said reaction chamber,
one end of said conduit being connected to said helical flow passageway to receive a working fluid therefrom and flow said working fluid within said conduit through the reaction chamber to the other end of said conduit,
means to supply a working fluid to said helical flow passageway,
means connected to the other end of the helical flow passageway to receive the working fluid from the conduit,
a spray means axially extending into said reaction for a major portion of the length of the reaction chamber and adapted to spray substantially along the length thereof,
means to supply oxidant to said spray means, and
said spray means being adapted to spray the oxidant into the reaction chamber to be reacted with fuel.

8. A power system comprising:
   a reactor having walls forming a reaction chamber for the reaction of a fuel and an oxidant,
   means forming a double helical flow passageway around the outer periphery of said reaction chamber,
   a conduit extending through said reactor and having a closed end in said reactor,
   a plurality of tubes mounted within said reactor and having one end leading into the conduit closed end and the other end connected to the helical flow passageway
   means to supply a working flued to said helical flow passageway,
   a spray means axially extending into said reaction for a major portion of the length of the reaction chamber and adapted to spray substantially along the length thereof,
   means to supply oxidant to said spray means, and said spray means being adapted to spray the oxidant into the reaction chamber to be reacted with fuel whereby working fluid is circulated through the reaction chamber by said conduit and tubes.

9. A reactor boiler system comprising:
   a reactor havings walls forming a reaction chamber for the reaction of a fuel and an oxidant,
   means forming a helical flow passageway around a portion of the periphery of said reaction chamber,
   means to supply a working fluid to said helical flow passageway,
   a conduit means extending within said reaction chamber, one end of said conduit being connected to said helical flow passageway to receive a working fluid therefrom and flow said working fluid within said conduit means within the reaction chamber to the other end of said conduit means,
   means connected to the other end of the conduit means to receive the working fluid therefrom,
   a spray means axially extending into said reaction chamber for a major portion of the length of the reaction chamber and adapted to spray substantially along the length thereof,
   means to supply oxidant to said spray means, and said spray means being adapted to spray the oxidant into the reaction chamber to be reacted with the fuel.

10. A reactor boiler system comprising:
    a reactor having walls forming a reaction chamber for the reaction of a fuel and an oxidant,
    means forming a helical flow passageway around a portion of the outer periphery of said reaction chamber,
    means to supply a working fluid to said helical flow passageway,
    a plurality of tubes axially extending within said reaction chamber,
    one end of said tubes being connected to said helical flow passageway to receive a working fluid therefrom and flow said working fluid within said tubes within the reaction chamber to the other end of said tubes,
    means connected to the other end of the tubes to receive the working fluid therefrom,
    a spray means axially extending into said reaction for a major portion of the length of the reaction chamber and adapted to spray substantially along the length thereof,
    means to supply oxidant to said spray means, and said spray means being adapted to spray the oxidant into the reaction chamber to be reacted with fuel.

11. A reactor boiler system comprising,
    a reactor having walls forming a reaction chamber for containing a supply of lithium type fuel,
    a container having inner and outer walls forming an oxidant chamber for containing a supply of oxidant. and being disposed circumjacent said reactor,
    means for transmitting said oxidant from said container into said reaction chamber, and
    means for circulating a working fluid through said reaction chamber including
    said walls of said reaction chamber and said inner wall of said oxidant chamber forming together with one another circulation passage means between said reaction chamber and said oxidant chamber and in full heat exchange relation with said reaction chamber.

12. A method of power generation which comprises, carrying out in a closed chamber an exothermic chemical reaction in which the fuel components react at substantially constant volume and without the production of gaseous reaction products, passing a working medium through one compartment of a two-compartment heat exchanger of which the other compartment is the closed chamber so that the working medium picks up heat conductively from the contents of the closed chamber, and expanding the heated working medium through a prime mover to generate power thus cooling the working medium.

13. A gas turbine having a rotor system which includes a turbine, means for supplying a working medium to the turbine, and a heating system which comprises: a closed chamber containing a first chemical, means for introducing into the closed chamber a second chemical to react exothermally with the first chemical in the closed chamber, and heat exchanger means of which the closed chamber forms a part for conductively transferring heat from the contents of the closed chamber to the working medium upstream of the turbine.

References Cited

UNITED STATES PATENTS

| | | | |
|---|---|---|---|
| 2,158,735 | 5/1939 | Vigneault | 122—248 |
| 669,738 | 3/1901 | Thomson | 122—248 |
| 717,260 | 12/1902 | Oates | 122—248 |
| 1,532,930 | 4/1925 | O'Neill. | |
| 2,152,972 | 4/1939 | Pateras Pescara | 60—12 |
| 2,193,863 | 3/1940 | Egloff | 60—105 X |
| 2,484,221 | 10/1941 | Gulbransen | 60—50 |
| 2,706,890 | 4/1965 | Schmidt | 60—50 |
| 1,349,969 | 8/1920 | Leathers | 122—21 |
| 2,303,995 | 12/1942 | Grindle | 122—21 |
| 1,419,267 | 6/1922 | Kasley | 60—37 |
| 1,506,323 | 8/1924 | O'Neill | 60—50 |
| 2,607,192 | 8/1952 | Wood et al. | 60—36 |

CARLTON R. CROYLE, Primary Examiner

U.S. Cl. X.R.

60—39.46; 122—248